US009717326B2

(12) United States Patent
Ilse

(10) Patent No.: US 9,717,326 B2
(45) Date of Patent: Aug. 1, 2017

(54) PEDESTAL APPARATUS

(71) Applicant: Hansjorg Ilse, Nedlands (AU)

(72) Inventor: Hansjorg Ilse, Nedlands (AU)

(*) Notice: Subject to any disclaimer, the term of this patent is extended or adjusted under 35 U.S.C. 154(b) by 0 days.

(21) Appl. No.: 15/120,262

(22) PCT Filed: Nov. 25, 2014

(86) PCT No.: PCT/AU2014/001071
§ 371 (c)(1),
(2) Date: Aug. 19, 2016

(87) PCT Pub. No.: WO2015/123716
PCT Pub. Date: Aug. 27, 2015

(65) Prior Publication Data
US 2017/0065074 A1 Mar. 9, 2017

(30) Foreign Application Priority Data
Feb. 21, 2014 (AU) ................................ 2014900571

(51) Int. Cl.
A47B 9/20 (2006.01)
F16M 11/28 (2006.01)
(Continued)

(52) U.S. Cl.
CPC .................. A47B 9/20 (2013.01); A47B 3/00 (2013.01); A47B 3/0803 (2013.01); A47B 7/02 (2013.01);
(Continued)

(58) Field of Classification Search
CPC .......... A47B 9/20; A47B 3/00; A47B 3/0803; A47B 7/02; A47B 2003/0806;
(Continued)

(56) References Cited

U.S. PATENT DOCUMENTS 2,600,735 A * 6/1952 Corneliussen ........... A47C 3/22
108/146
2,794,612 A * 6/1957 Clifton ................... F16M 11/28
248/188.5
(Continued)

FOREIGN PATENT DOCUMENTS

DE 4106648 A1 9/1992
FR 2707728 A1 1/1995
WO WO 2008/040034 A2 4/2008

Primary Examiner — Tan Le
(74) Attorney, Agent, or Firm — Heisler & Associates

(57) ABSTRACT

The invention discloses a pedestal apparatus for an article of furniture. The pedestal apparatus has an elongate post formation defining a first end and a second end and having a longitudinal axis. The post formation immovably supports a fixed foot arrangement and also movably supports a variable foot arrangement. The variable foot arrangement is selectively movable along and around the longitudinal axis for varying a longitudinal and angular proximity between the variable foot arrangement and the fixed foot arrangement. Biasing means are provided for controlling movement of the variable foot arrangement whereby, in use, the biasing means causes both the fixed foot arrangement and the variable foot arrangement to abut an underlying surface and thereby provide a substantial stabilization of the pedestal apparatus.

19 Claims, 14 Drawing Sheets

(51) Int. Cl.
*A47B 7/02* (2006.01)
*A47B 3/00* (2006.01)
*A47B 91/00* (2006.01)
*A47B 13/02* (2006.01)
*A47B 3/08* (2006.01)
*A47C 3/04* (2006.01)
*A47C 7/00* (2006.01)

(52) U.S. Cl.
CPC ............. *A47C 3/045* (2013.01); *A47C 7/002* (2013.01); *F16M 11/28* (2013.01); *A47B 2003/0806* (2013.01); *A47B 2013/025* (2013.01); *A47B 2200/0021* (2013.01); *A47B 2200/0052* (2013.01)

(58) Field of Classification Search
CPC ...... A47B 2013/025; A47B 2200/0021; A47B 2200/0052; A47B 9/08; A47C 3/045; A47C 7/002; F16M 11/28; F16B 2/246; Y10T 403/32426; Y10S 285/902
USPC ...... 248/188.5, 188.8, 163.1, 165, 166, 169, 248/354.1, 410, 411, 459, 460, 463; 403/104, 105, 109.5, 328; 285/902; 108/146
See application file for complete search history.

(56) References Cited

U.S. PATENT DOCUMENTS

| | | | |
|---|---|---|---|
| 2,806,723 A | | 9/1957 | Fairclough |
| 2,817,548 A | * | 12/1957 | Uthemann ............. A45B 23/00 403/104 |
| 4,761,092 A | * | 8/1988 | Nakatani ............... F16B 7/1454 248/188.5 |
| 6,662,731 B2 | * | 12/2003 | Teppo .................. A47B 3/0818 108/6 |
| 6,913,231 B2 | * | 7/2005 | Speggiorin ............ F16M 11/32 248/169 |
| 2017/0065074 A1 | * | 3/2017 | Ilse ...................... A47B 3/0803 |

* cited by examiner

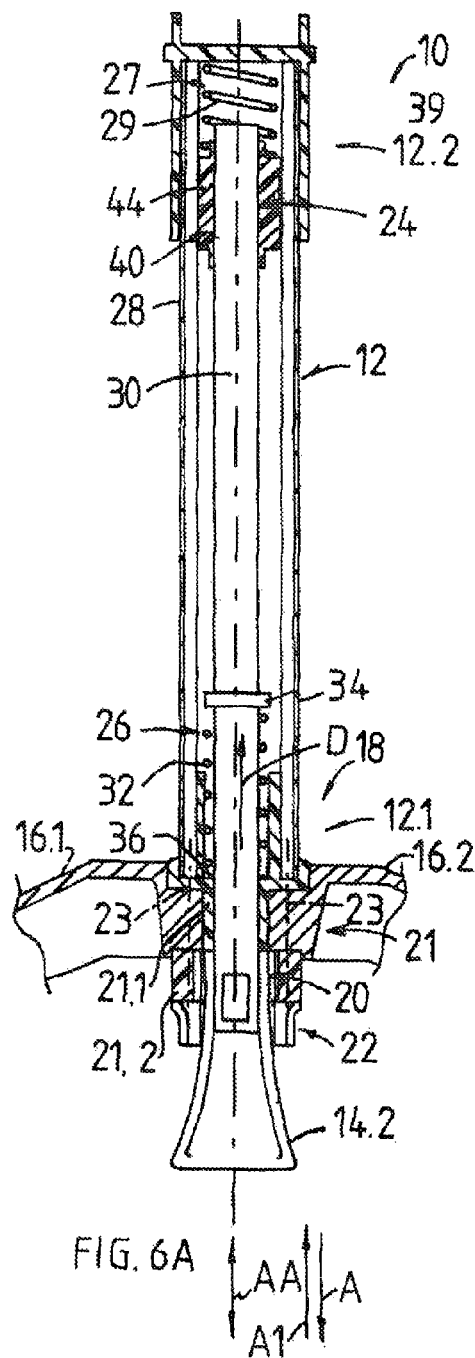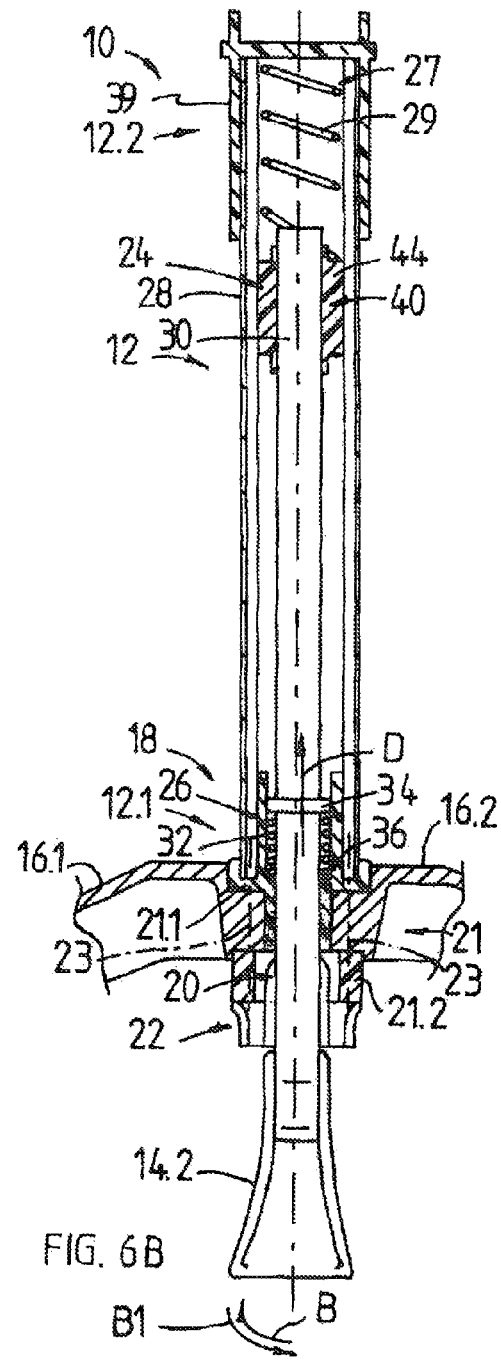
FIG. 6A
FIG. 6B

FIG. 11
FIG. 12
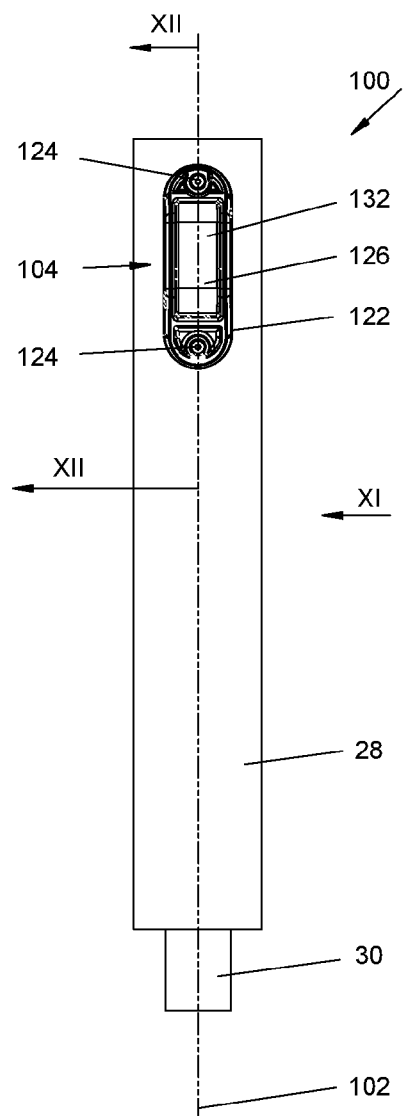
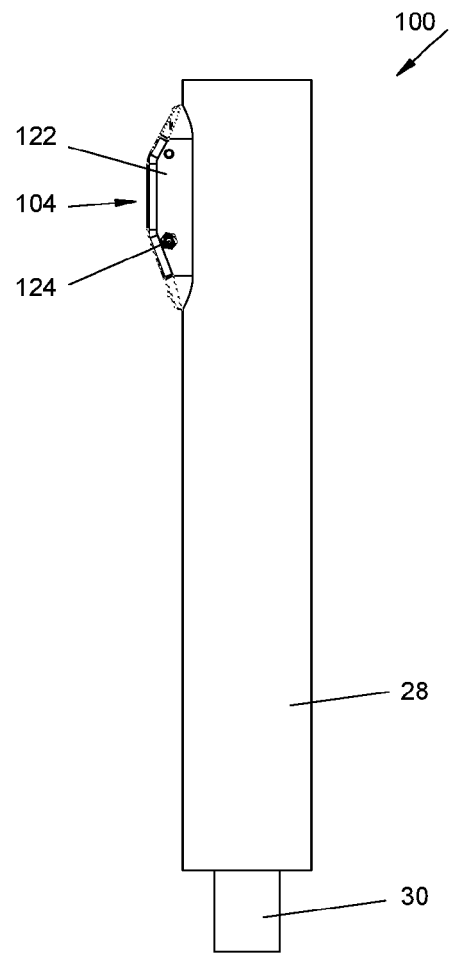

FIG. 14
FIG. 15
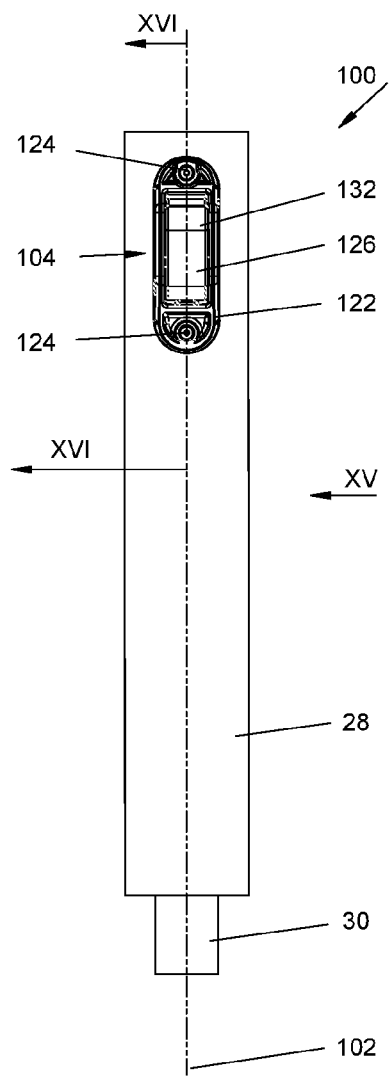
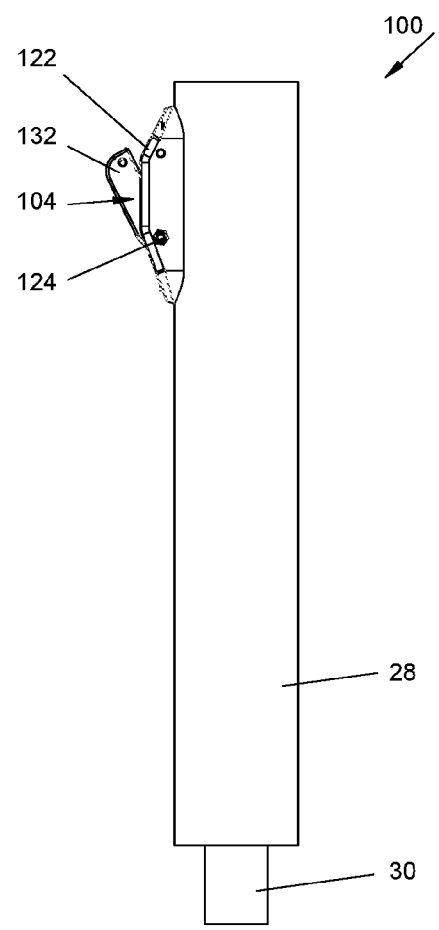

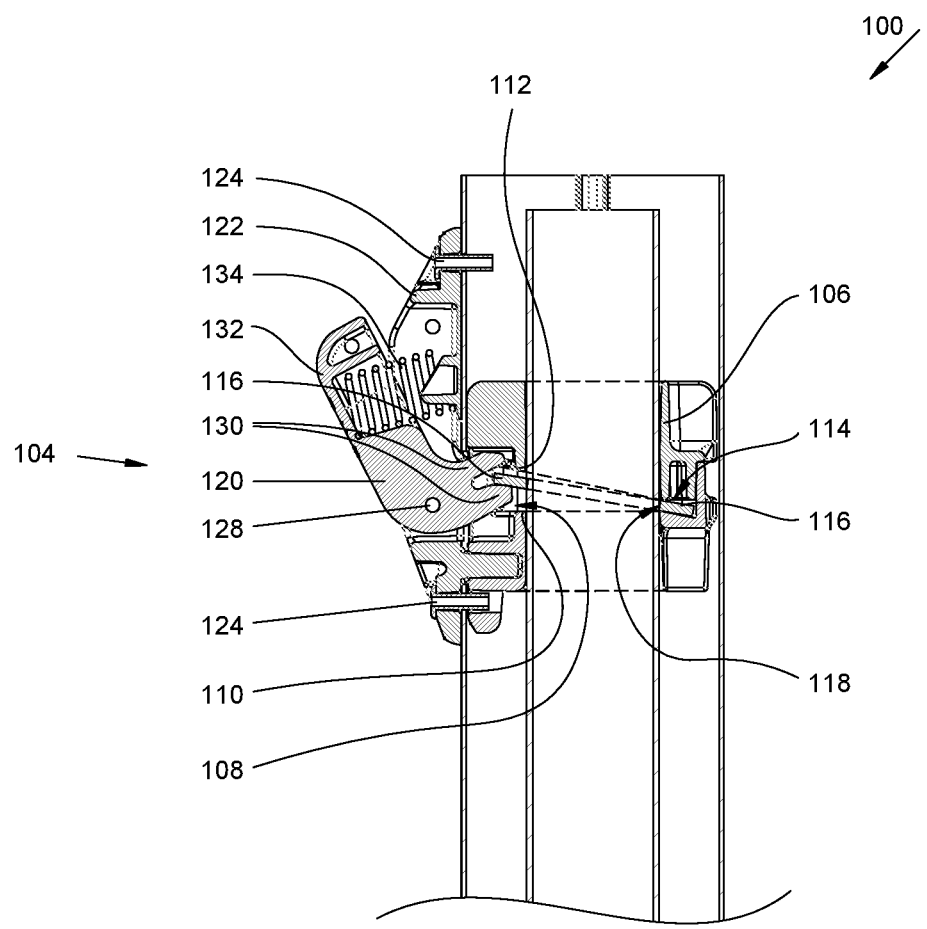

PEDESTAL APPARATUS

FIELD OF INVENTION

The present invention relates to a pedestal apparatus.

More particularly, the present invention relates to a pedestal apparatus for an article of furniture, such as a table, and to a locking unit for such a pedestal apparatus.

BACKGROUND TO INVENTION

A pedestal is often used to support an object, such as a tabletop or a seat. Such pedestals often have feet for engaging with an underlying supporting surface, such as a ground surface or a floor surface, so as to support the object above the supporting surface.

In many cases, it would be advantageous if such pedestals were collapsible, thereby to render tables, or stools, or chairs, or the like, of which such pedestals form part, collapsible by moving the pedestal between a deployed and operable condition to a collapsed and non-operable condition. In such a case, the task of storing the tables, or the like, can be made easier than in the case where the pedestals are not collapsible.

It is known that a pedestal with four rigid feet can tend to rock if the supporting surface is uneven. This compromises the function of the pedestal to support the object and can be annoying for a user when the pedestal forms part of a table, or the like.

It is an object of the invention to provide a pedestal, which has feet that can be displaced between a deployed condition and a collapsed condition, so as to ease the task of storing the object.

It is another object of the invention to provide a pedestal, which defines an arrangement without locking means that enables the object to be stably supported on an uneven underlying surface.

SUMMARY OF INVENTION

According to an embodiment of the invention, there is provided a pedestal apparatus for an article of furniture, the pedestal apparatus comprising:
  an elongate post formation defining a first end and a second end and having a longitudinal axis;
  a fixed foot arrangement being immovably supported by the post formation;
  an variable foot arrangement being movably supported by the post formation, wherein the variable foot arrangement is selectively movable along and around the longitudinal axis for varying a longitudinal and angular proximity between the variable foot arrangement and the fixed foot arrangement; and
  and biasing means for controlling movement of the variable foot arrangement whereby, in use, the biasing means causes both the fixed foot arrangement and the variable foot arrangement to abut an underlying surface and thereby provide a substantial stabilization of the pedestal apparatus.

The biasing means may be adapted to restrict the extent of longitudinal movement of the variable foot arrangement relative to the fixed foot arrangement.

The biasing means may be arranged to restrict movement of the variable foot arrangement to within a range of 1 mm to 50 mm along the longitudinal axis and to support the variable foot arrangement at an intermediate equilibrium rest position substantially midway of this range.

The biasing means may be a coil spring operatively provided between the post formation and the variable foot arrangement.

The post formation may include a tube portion and a shaft portion, the shaft portion being telescopically supported by the tube portion, and wherein the fixed foot arrangement is provided on the tube portion and the variable foot arrangement is provided on the shaft portion.

The tube portion and the shaft portion may have a close tolerance for substantially preventing any transverse movement of the shaft portion off coaxial alignment with the tube portion.

The biasing means may movably support the shaft portion relative to the tube portion in an equilibrium rest position, in which position the variable foot formation is longitudinally offset from the fixed foot formation.

The variable foot formation may be longitudinally offset from the fixed foot formation by between 1 mm to 50 mm.

The variable foot formation may be longitudinally offset from the fixed foot formation by between 20 mm to 30 mm.

The pedestal apparatus may include a locking means being arranged to lock the shaft portion relative to the tube portion, thereby to lock the variable foot arrangement at a desired position and angle along the longitudinal axis relative to the post formation.

The locking means may include a locking disc surrounding the shaft portion.

The locking disc may be movable between an unlocked condition wherein the locking disc is orientated substantially perpendicularly to the longitudinal axis, and a locked condition wherein the locking disc is rotated to be non-perpendicular to the longitudinal axis.

The locking disc may be rotated off its perpendicular orientation through between 5° to 15° when in its unlocked condition.

The locking disc may be rotated off its perpendicular orientation through 10° when in its unlocked condition.

The tube portion may immovably support a fulcrum, wherein at least a part of the locking disc is located in the fulcrum.

The locking disc may be at least partially rotatable around the fulcrum.

The locking means may include a lever for gripping the locking disc along a part of its perimeter.

The fulcrum and the lever may be diametrically opposed to each other on opposite sides of the shaft portion.

The locking means may include a biasing means being adapted to bias the locking disc into its locked condition.

BRIEF DESCRIPTION OF DRAWINGS

The present invention will now be described, by way of example, with reference to the accompanying schematic drawings, in which:

FIGS. 6A, 6B and 6C are cross-sectional side views corresponding to a part of the pedestal apparatus as shown in FIG. 1, and showing a variable foot arrangement of the pedestal apparatus being displaced from a deployed condition, as shown in FIG. 6A, in which the variable foot arrangement is angularly spaced apart relative to a fixed foot arrangement, to an intermediate position as shown in FIG. 6B, and further to a collapsed condition, as shown in FIG. 6C, in which the variable foot arrangement is angularly adjacent the fixed foot arrangement;

FIG. 11 is a front view of an upper portion of a post formation for use in a third embodiment of a pedestal apparatus according to the present invention, the third embodiment comprising a locking unit being shown in an unlocked condition;

FIG. 12 is a side view of the post formation seen along arrow XII in FIG. 11;

FIG. 14 is a front view of the post formation of FIGS. 11 to 13, wherein the locking unit is shown in an locked condition;

FIG. 15 is a side view of the post formation seen along arrow XV in FIG. 14; and FIG. 16 is an enlarged sectional side view of a part of the post formation seen along arrows XVI-XVI in FIG. 14.

DETAILED DESCRIPTION OF THE DRAWINGS

Figure 1:
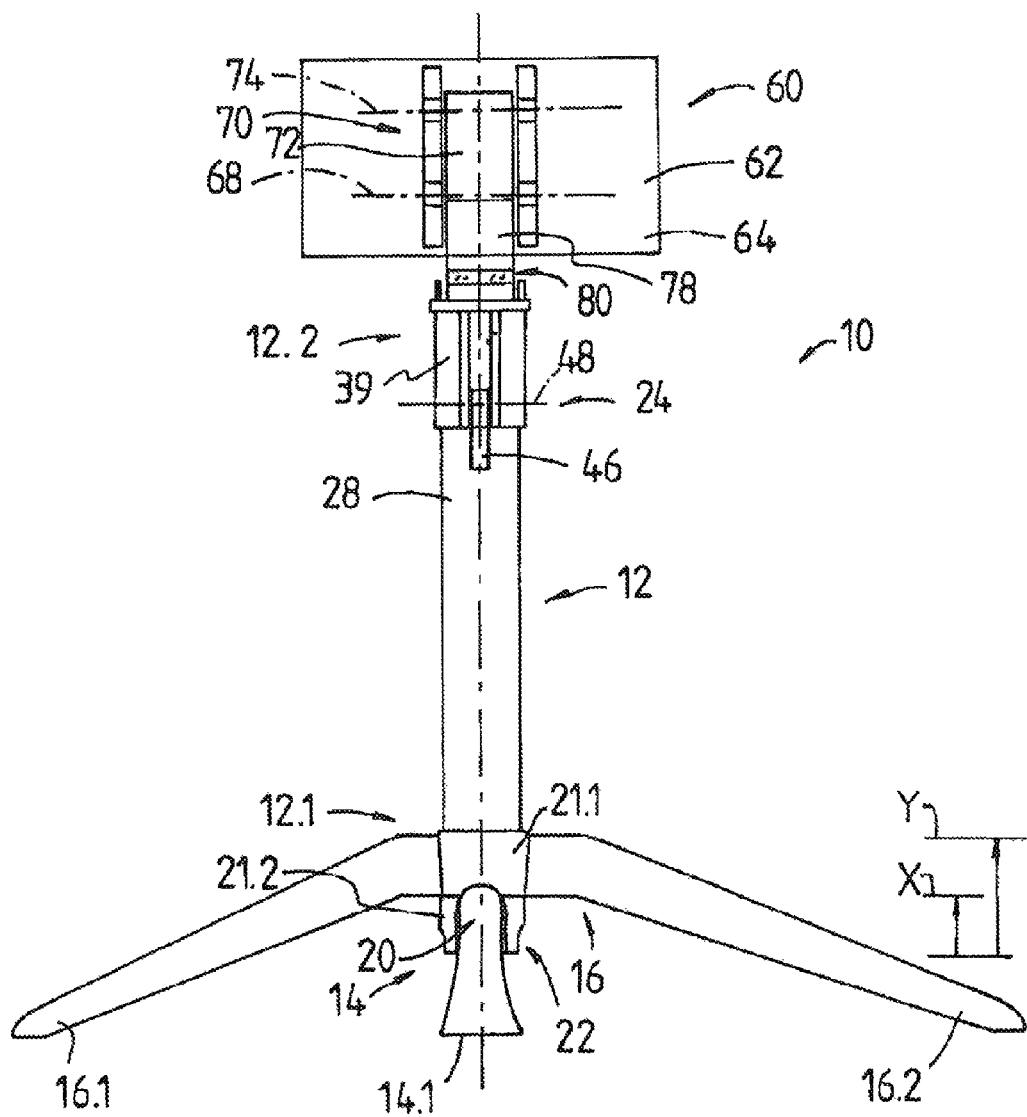
FIG. 1 is a front view of a first embodiment of a pedestal apparatus according to the present invention.
Figure 2:
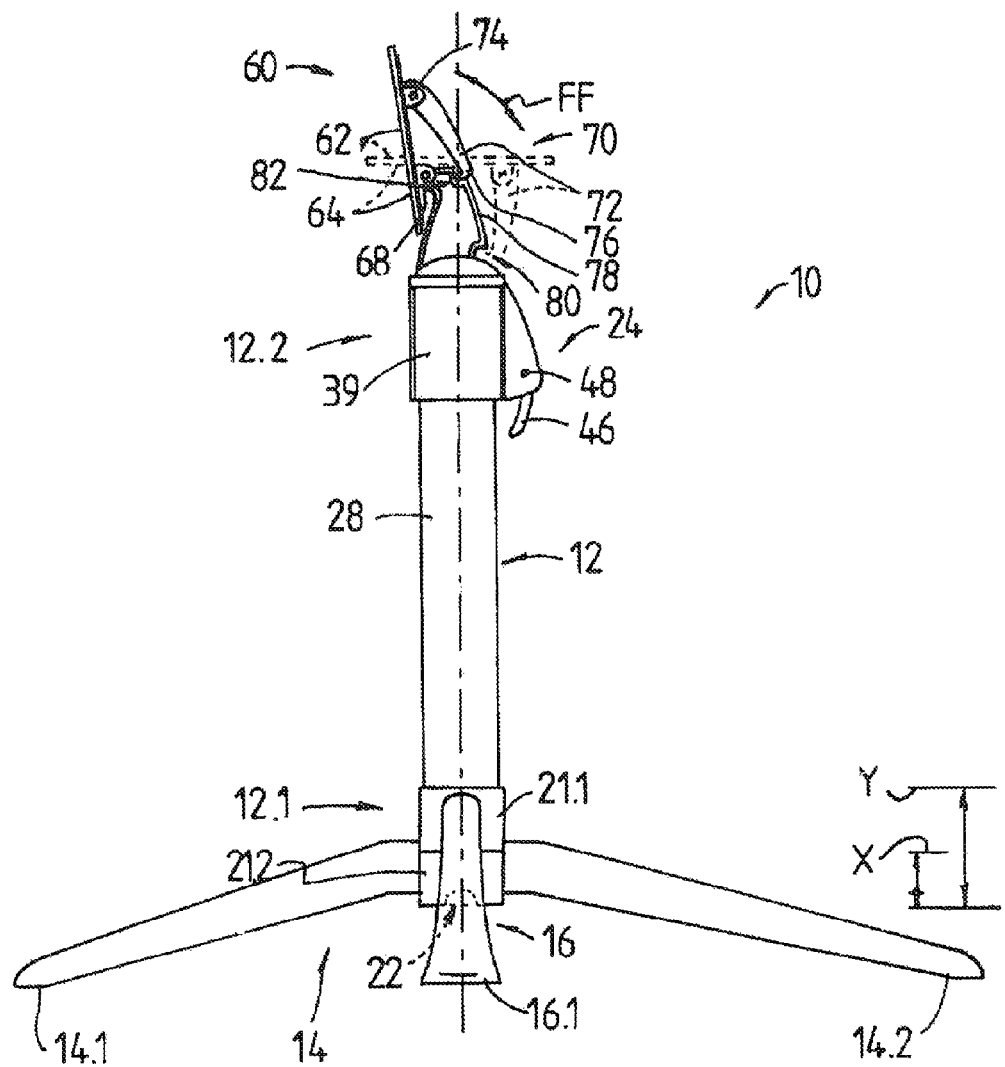
FIG. 2 is a side view of the pedestal apparatus shown in FIG. 1.

Referring to FIGS. 1 and 2 of the drawings, there is shown a pedestal apparatus in accordance with a first embodiment of the invention, being generally indicated by reference numeral 10.

The pedestal apparatus 10 includes an elongate post formation 12 that defines two opposed end portions 12.1, 12.2. The pedestal apparatus 10 further includes a variable foot arrangement 14 comprising diametrically opposed feet 14.1, 14.2 that extend radially outwardly from the end portion 12.1 of the post formation 12 and a fixed foot arrangement 16 comprising diametrically opposed feet 16.1, 16.2 extending radially outwardly from the end portion 12.1.

The variable foot arrangement 14 extends from one longitudinal position X on the post formation 12 and the fixed foot arrangement 16 extends from a different longitudinal position Y on the post formation 12. As can best be seen with reference to FIG. 5 of the drawings, in which like reference numerals have been used to designate similar parts unless otherwise stated, the difference in the longitudinal positions (and thus the operative heights) of the variable foot arrangement 14 and the fixed foot arrangement 16 permits the foot 16.1 of the pedestal apparatus 10 to be positioned over the foot 14.1 of another pedestal apparatus 10A, thereby to enable the pedestal apparatus 10 to be positioned in close proximity relative to the other pedestal apparatus 10A. In this way, a number of pedestal apparatuses 10, 10A, 10B, 10C, 10D can be stored with relative ease one adjacent another.

Figure 3:
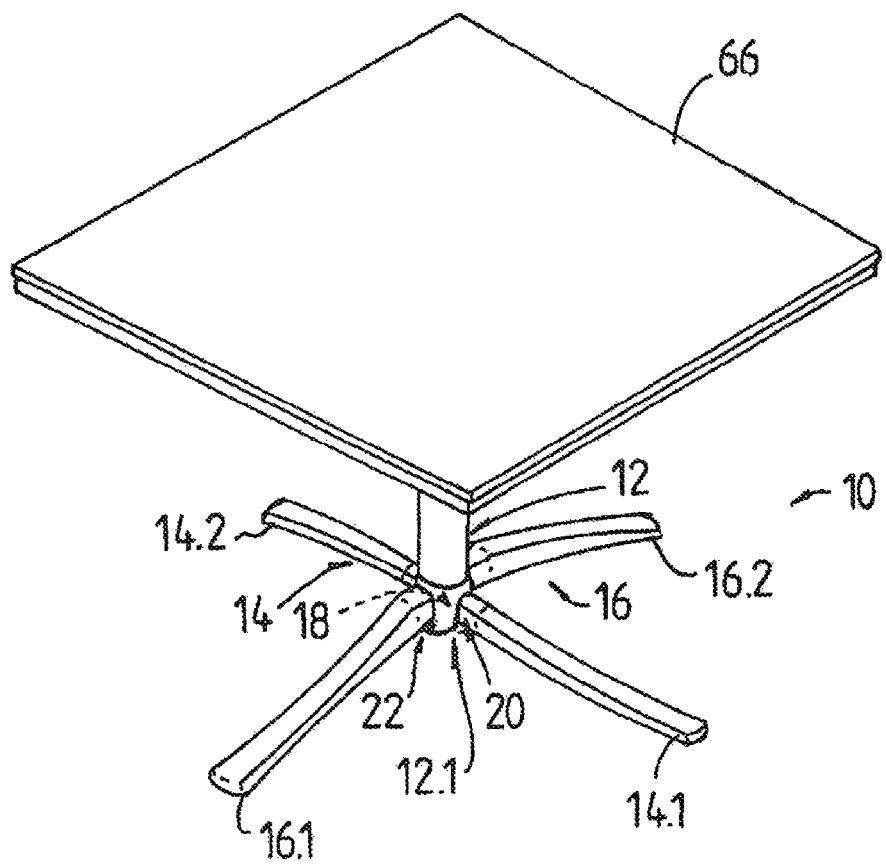
FIG. 3 is a perspective view of a table including the pedestal apparatus shown in FIGS. 1 and 2, the table and the pedestal apparatus being shown in a deployed condition.
Figure 4:
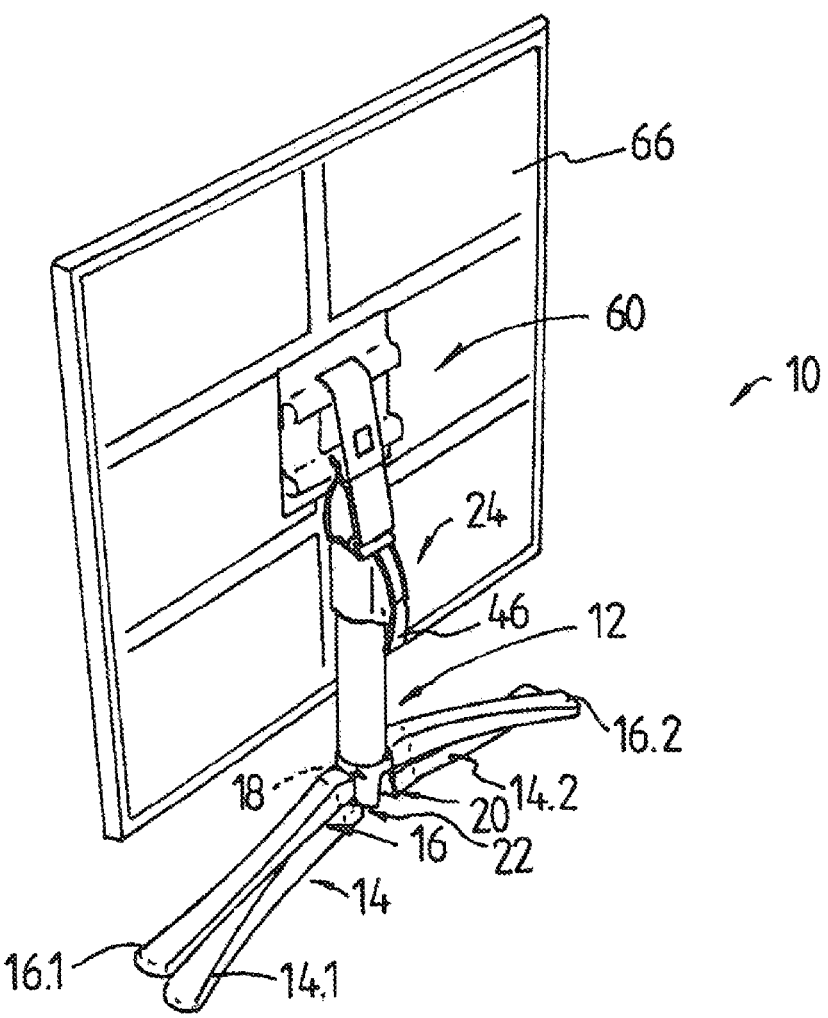
FIG. 4 is a perspective view of the table of FIG. 3, being shown in a collapsed condition.

Referring to FIGS. 3 and 4 of the drawings, the pedestal apparatus 10 includes displacement means, generally indicated at 18, arranged to enable the variable foot arrangement 14 to be angularly displaceable relative to the fixed foot arrangement 16 between a deployed condition, as indicated in FIG. 3, in which the foot arrangements 14, 16 are angularly spaced apart relative to one another, and a collapsed condition, as indicated in FIG. 4, in which the foot arrangements 14, 16 are angularly adjacent one another.

As can best be seen with reference to FIGS. 1, 2 and 6 of the drawings, the end portion 12.1 of the elongate post formation 12 defines a deployed seat formation 20 for seating the variable foot arrangement 14 relative to the post formation 12 when the variable foot arrangement 14 is in the deployed condition. The end portion 12.1 defines a collapsed seat formation 22 for seating the variable foot arrangement 14 relative to the elongate post formation 12 when the variable foot arrangement 14 is in the collapsed condition.

The seat formations 20, 22 are typically defined by an end cap 21. Typically, the seat formations 20, 22 are in the form of diametrically opposed recesses defined by the end cap 21. The recesses are arranged to receive the feet 14.1, 14.2 of the variable foot arrangement 14. The end cap 21 is formed of two parts 21.1, 21.2 which are held together and joined to the end portion 12.1 by conventional fasteners, such as screws, as indicated at 23.

The variable foot arrangement 14 is displaceable in a longitudinal direction, as indicated by arrows AA in FIG. 6A of the drawings, relative to the post formation 12. The pedestal apparatus 10 includes locking means, generally indicated by reference numeral 24, for locking the variable foot arrangement 14 at a longitudinal position relative to the post formation 12.

Figure 6C:
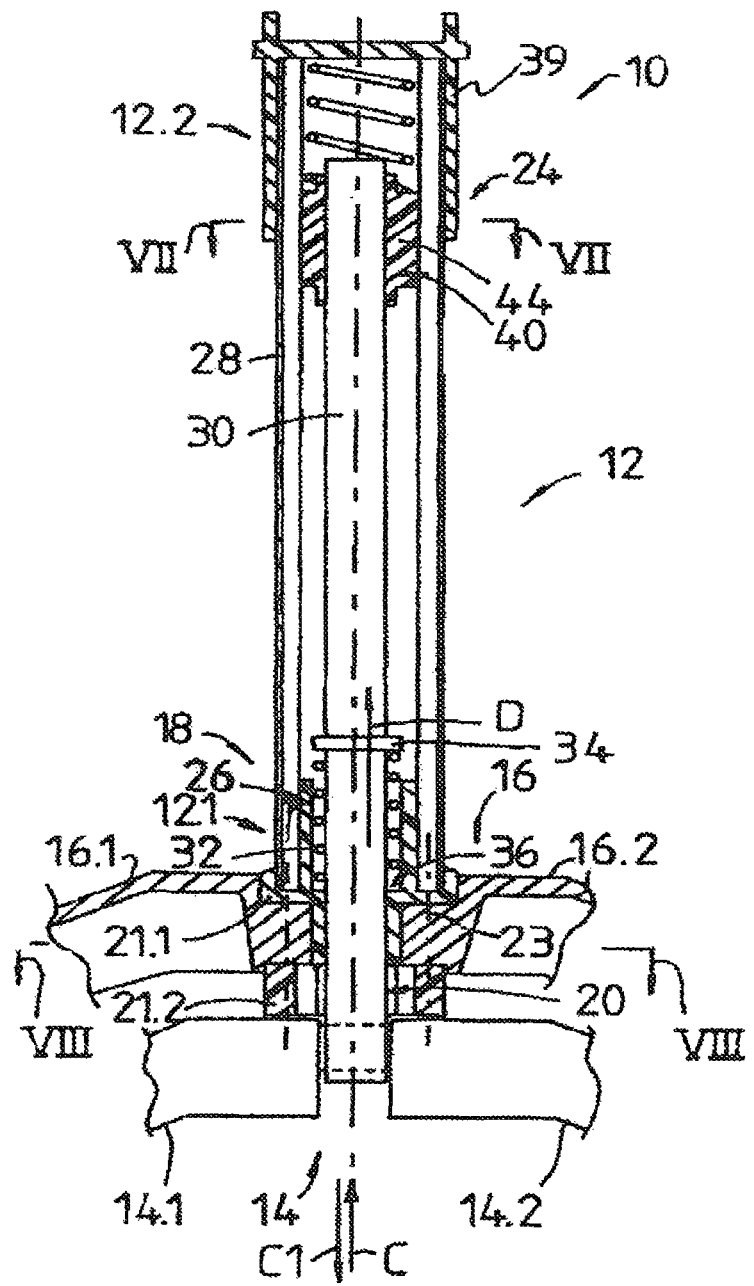
Figure 7:
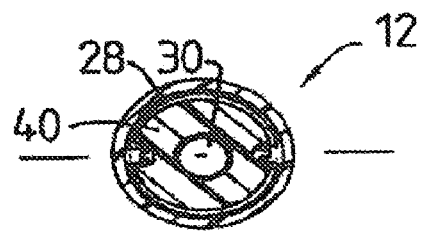
FIG. 7 is a cross-sectional view along arrows VII-VII in FIG. 6C.
Figure 8:
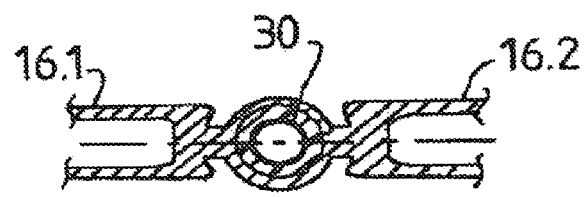
FIG. 8 shows a cross-sectional view along arrows VIII-VIII in FIG. 6C.

The variable foot arrangement 14 is angularly displaceable relative to the fixed foot arrangement 16 by displacing the variable foot arrangement 14 in the longitudinal direction, as indicated by arrow A in FIG. 6A of the drawings, so as to be unseated from the deployed seat formation 20, then to be displaced angularly relative to the fixed foot arrangement 16, as indicated by arrow B in FIG. 6B of the drawings, so as to enable the variable foot arrangement 14 to seat in the collapsed seat formation 22, as indicated by arrow C in FIG. 6C of the drawings. It will be appreciated that to return the variable foot arrangement 14 to a position seated in the deployed seat formation 20 from a seated position in the collapsed seat formation 22, the variable foot arrangement 14 is displaced in a longitudinal direction, as indicated by arrow C1 in FIG. 6C of the drawings, so as to be unseated from the collapsed seat formation 22, then to be displaced angularly relative to the fixed foot arrangement 16 as indicated by arrow B1 in FIG. 6B of the drawings, so as to enable the variable foot arrangement 14 to seat in the deployed seat formation 20, as indicated by arrow A1 in FIG. 6A of the drawings.

As can best be seen with reference to FIGS. 6A to 6C, the displacement means 18 includes inward urging means, generally indicated by reference numeral 26, for urging the variable foot arrangement 14 to remain in a seated position in the deployed seat formation 20 when positioned therein. The inward urging means 26 is also arranged to urge the variable foot arrangement 14 to remain in a seated position in the collapsed seat formation 22 when the variable foot arrangement 14 is positioned therein.

The post formation 12 defines a tube portion 28 and a shaft portion 30 positioned within the tube portion 28. Advantageously, the tube portion 28 and the shaft portion 30 are in the form of Aluminium tubing.

In the exemplary embodiment the variable foot arrangement 14 is fixed relative to the shaft portion 30, while the fixed foot arrangement 16 is fixed relative to the tube portion 28. The inward urging means 26 is arranged to urge the shaft portion 30 in an operatively upward direction, as indicated by arrow D. Typically, the inward urging means 26 is in the form of a coil spring 32.

Advantageously, the shaft portion 30 is arranged to pass through the end cap 21. Advantageously, the end cap 21 is of a low friction material so as to enable the shaft portion 30 to slide through the end cap 21 with relative ease. The end cap 21 can be made of Nylon™.

The spring 32 acts against a collar 34 secured on the shaft portion 30 and against a seat 36 fixed relative to the tube portion 28. The spring 32 is under compression so as to urge the collar 34, and consequently also the shaft portion 30, away from the seat 36.

The locking means 24 is arranged selectively to lock the shaft portion 30 relative to the tube portion 28 thereby to lock the variable foot arrangement 14 at a longitudinal position relative to the post formation 12.

Further outward urging means 27 is provided, which can also be in the form of a coil spring 29. The outward urging means 27 acts under compression to urge the shaft portion 30 in a direction toward the inward urging means 26. The inward urging means 26 and the outward urging means 27 are both preloaded under compression so that when the locking means 24 is in an unlocked condition, the shaft portion 30 is displaced into an equilibrium position. In the equilibrium position, when the variable foot arrangement 14 is in the deployed seat formation 20, the variable foot arrangement 14 is positioned such that the feet 14.1, 14.2 are at generally the same level as the feet 16.1, 16.2 of the fixed foot arrangement 16. In this position, the variable foot arrangement 14 can be displaced in an operatively upward direction against the urging of the outward urging means 27, or in an operatively downward direction against the urging of the inward urging means 26.

Figure 9:
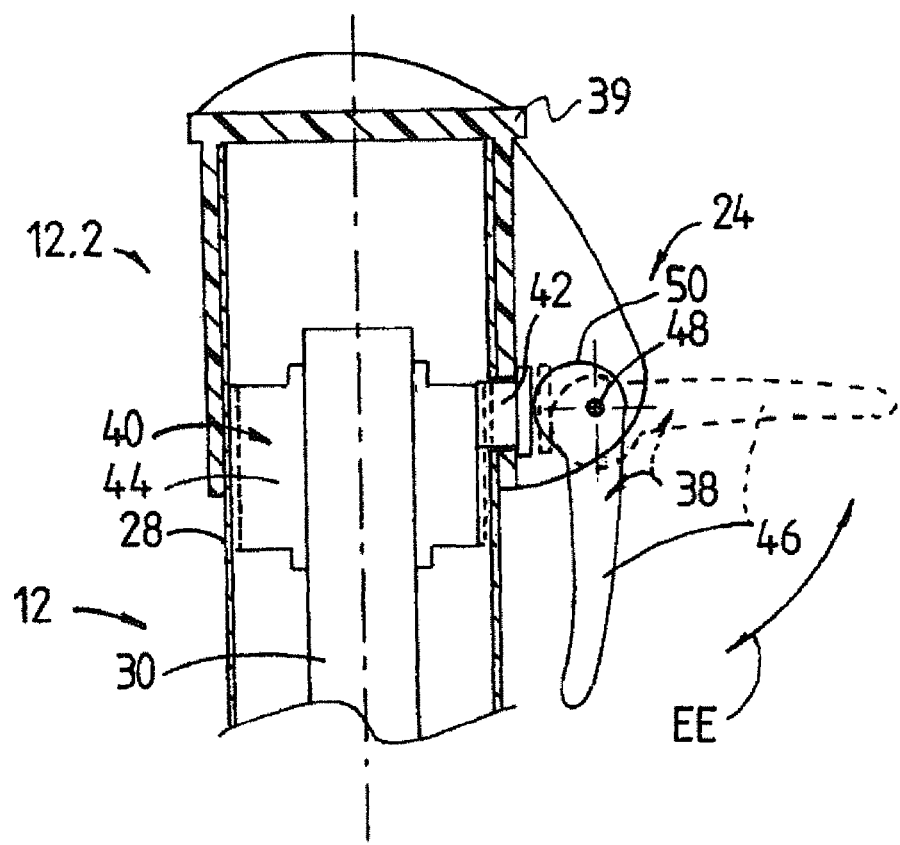
FIG. 9 shows a sectional side view of a locking arrangement of the pedestal shown in the preceding Figures.

As can best be seen with reference to FIG. 9 of the drawings, the locking means 24 includes a manually operable actuation member 38. A cap formation 39 is typically provided on the end portion 12.2 of the post formation 12. Advantageously, the cap formation 39 is of Nylon™. The actuation member 38 is arranged to enable the locking means 24 to lock the variable foot arrangement 14 at a longitudinal position relative to the post formation 12. The locking means 24 further includes a frictional engaging member 40, operatively associated with the actuation member 38, which frictionally engages the shaft portion 30 relative to the tube portion 28 in response to actuation of the actuation member 38, thereby to lock the variable foot arrangement 14 at a longitudinal position relative to the post formation 12. The locking means 24 has a pressing member 42 operatively associated with the actuation member 38, which pressing member 42 is arranged to press the engaging member 40, thereby to frictionally engage the shaft portion 30 to the tube portion 28 in response to manual actuation of the actuation member 38.

Typically, the engaging member 40 is in the form of a collar 44 that is fixed onto the shaft portion 30. The collar 44 can be made of any appropriate material, for example Nylon™, or rubber, or a rubber-like material. The material can be resilient.

The collar 44 is arranged to permit the shaft portion 30 to move in a longitudinal direction relative to the tube portion 28 when the locking means 24 is in an unlocked condition and to immovably lock the shaft portion 30 to the tube portion 28 when the locking means 24 is in a locked condition.

Conveniently, the actuation member 38 is in the form of a lever 46 that is pivotally mounted relative to the tube portion 28 by means of a pivotal connection 48, so as to be angularly displaceable, as indicated by arrows EE, between a locking condition (indicated in solid lines) and an unlocked condition (as indicated in dashed lines).

The lever 46 is operatively associated with a cam 50, so as to cause the cam 50 to press the pressing member 42 thereby to cause the engaging member 40 to frictionally engage the shaft portion 30 relative to the tube portion 28 in response to the lever 46 being angularly displaced from the unlocked condition to the locking condition. Conveniently, the lever 46 defines the cam 50 at an end thereof.

As can best be seen with reference to FIGS. 1 and 2 of the drawings, the pedestal apparatus 10 further includes mounting means 60 for mounting an object on the pedestal apparatus 10. The mounting means 60 is defined at the end portion 12.2. The mounting means 60 includes a mounting formation 62 arranged to enable an object to be secured to the mounting means 60.

The mounting formation 62 can be in the form of a mounting plate 64 enabling an object, such as a tabletop 66, to be mounted thereon. Alternatively, the mounting plate 64 can be arranged to receive a seat (not shown).

The mounting means 60 includes a pivotal connection 68 whereby the mounting formation 62 is pivotally mounted relative to the end portion 12.2 so as to enable the tabletop 66 to be pivotally displaceable, as indicated by arrows FF, between a deployed condition (indicated in dashed lines in FIG. 2) and a collapsed condition (indicated in solid lines in FIGS. 1 and 2).

The mounting means 60 includes a retention arrangement, generally indicated by reference numeral 70, arranged to retain the mounting formation 62 in either its deployed condition or its collapsed condition. To this end, the retention arrangement 70 includes an arm 72 pivotally mounted relative to the mounting formation 62 by means of a pivotal connection 74. The arm 72 defines a locking protrusion 76 at a remote end thereof. The retention arrangement 70 further includes a retention formation 78 defining two opposed locating seat formations 80, 82 that are arranged to receive the locking protrusion 76 of the arm 72. Accordingly, the locking protrusion 76 seats in the seat formation 80 to retain the mounting formation 62 in its deployed condition. Similarly, the locking protrusion 76 seats in the seat formations 82 to retain the mounting formation 62 in its collapsed condition.

Conveniently, the pedestal apparatus 10 can be used as a pedestal of a table. In such case, the table includes a tabletop joined to the pedestal apparatus 10 by being mounted on the mounting formation 62. Alternatively the pedestal apparatus 10 can also be used as a pedestal for a stool, or a chair, or the like. The chair can include a seat joined to the pedestal apparatus 10 by being mounted on the mounting formation 62 of the pedestal apparatus 10. The mounting formation 62 can define apertures arranged to enable the tabletop or seat to be secured thereto by means of conventional fasteners, such as screws, bolts, rivets, or the like, extending through the apertures.

The pedestal apparatus 10 of the first embodiment will now be described in use, with reference to its application as a pedestal of a table.

When the table is positioned on a surface, the lever 46 is displaced into an unlocked condition to permit longitudinal displacement of the shaft portion 30 relative to the tube portion 28. Should the surface be uneven so as to cause rocking of the variable foot arrangement 14, the shaft portion 30 is further extended from the post formation 12 against the urging of the inward urging means 26 so as to cause both the feet 14.1, 14.2 to make contact with the surface. This can be achieved manually by stepping on the variable foot arrangement 14. Conveniently, the variable foot arrangement 14 is provided with a foot tab so that the shaft portion 30 can be extended from the post formation 12 by stepping on the foot tab. Once both feet 14.1, 14.2 make contact with the surface, the lever 46 is displaced into the locking position so as to inhibit further longitudinal displacement of the shaft portion 30 relative to the tube portion 28. In this way, the feet 14.1, 14.2 are retained in contact with the surface thereby to inhibit rocking of the table.

Conversely, should the surface be uneven so as to cause rocking of the fixed foot arrangement 16, the shaft portion 30 is retracted into the post formation 12 against the urging of the outward urging means 27 so as to cause both the feet 16.1, 16.2 to make contact with the surface. This can be achieved manually by pressing down on the table. Once both feet 16.1, 16.2 make contact with the surface, the lever 46 is displaced into the locking position so as to inhibit further longitudinal displacement of the shaft portion 30 relative to the tube portion 28. In this way, the feet 16.1, 16.2 are retained in contact with the surface thereby to inhibit rocking of the table.

Figure 5:
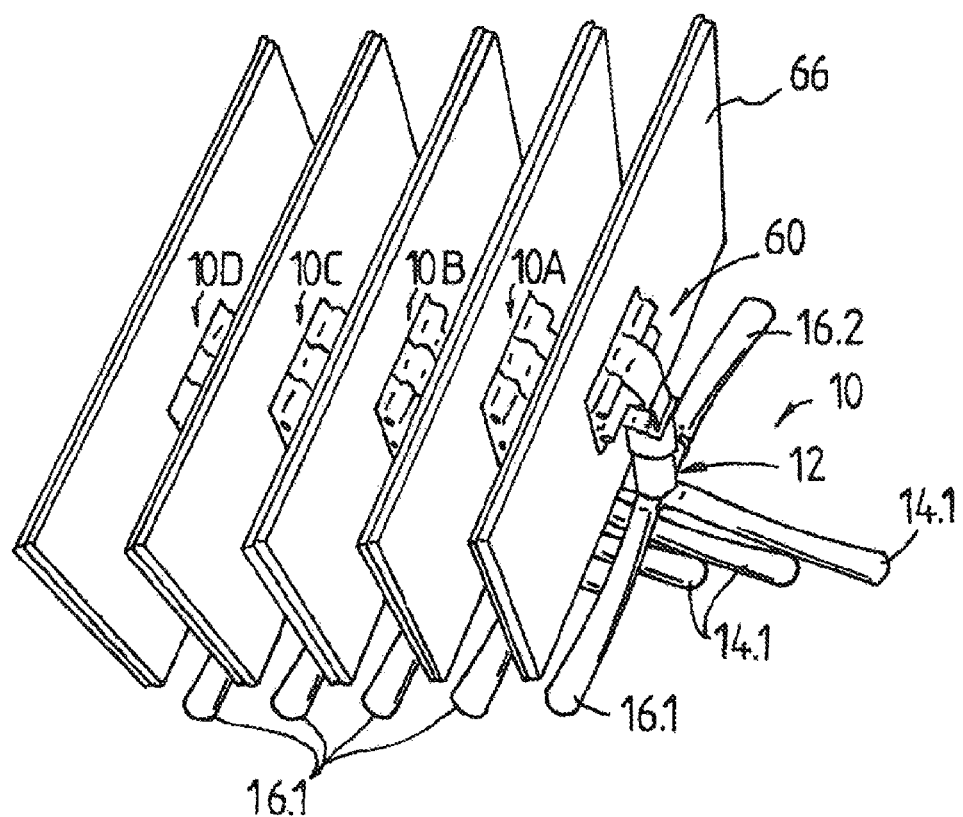
FIG. 5 is a perspective view from above, of a plurality of tables, each of which is similar to the table shown in FIGS. 3 and 4, the tables being in collapsed conditions and in close proximity relative to one another.

Should it be desired to store the table, the tabletop 66 is displaced into a collapsed condition, as shown in FIGS. 4 and 5 of the drawings. This is achieved by dislocating the locking protrusion 76 of the arm 72 from the seat formation 80, then angularly displacing the tabletop 66 into a collapsed condition and locating the locking protrusion 76 of the arm 72 into the seat formation 82. The table can then be stored together with other tables, as shown in FIG. 5 of the drawings.

In addition, the variable foot arrangement 14 can be angularly displaced relative to the fixed foot arrangement 16 so that they are positioned angularly adjacent one another as shown in FIG. 4 of the drawings.

Figure 10:
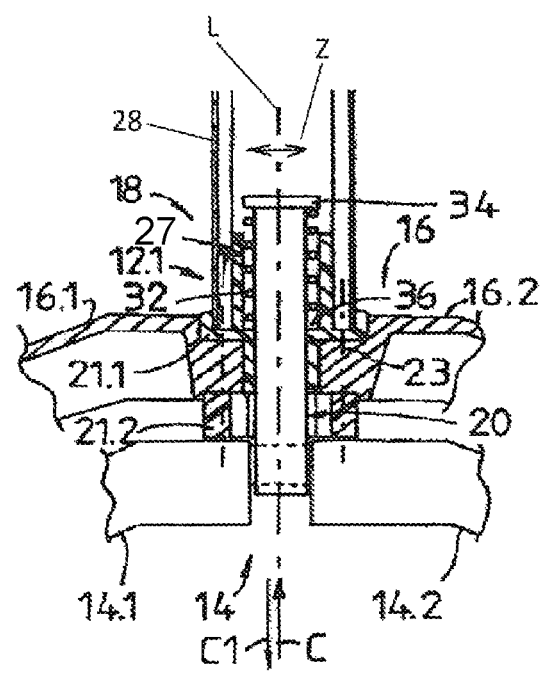
FIG. 10 is a cross-sectional view of lower portion of a second embodiment of a pedestal apparatus according to the present invention, the second embodiment comprising a simplified configuration having a fixed foot arrangement and a variable foot arrangement.

In a second embodiment of the present invention as shown in FIG. 10, in which like reference numerals have been used to indicate similar parts, the pedestal apparatus 10 comprises a simpler configuration and does not require or utilize the locking means 24. In this second embodiment there is provided an elongate post formation 12 having a fixed foot arrangement 16 fixed to the post formation 12 and extending radially outwardly from the end portion 12.1.

The post formation 12 comprises a tube portion 28 adapted to receive at least a part of an elongate shaft portion 30 connected to a variable foot arrangement 14. The shaft portion 30 is longitudinally adjustable within the tube portion 28 for providing a relative movement between the shaft portion 30 and the tube portion 28 and accordingly between the variable foot arrangement 14 and the fixed foot arrangement 16.

The tube portion 28 is dimensioned to snugly receive the shaft portion 30 and may comprise one or more guides, such as collars, positioning lugs or protrusions (not shown) at one, and preferably at two axially offset points. The guides have a close tolerance for substantially preventing any transverse movement of the shaft portion 30 and ensuring the longitudinal axis of the tube portion 28 and the longitudinal axis of the shaft portion 30 are preferably either substantially coaxial or substantially parallel.

This configuration limits a lateral displacement Z of the shaft portion 30 and has the effect of stabilizing the pedestal apparatus 10 by permitting axial travel but limiting transverse movement of the shaft portion 30 off coaxial alignment with the tube portion 28. Thus, movement of the shaft portion 30 with respect to the tube portion 28 is substantially limited to a linear displacement coaxial with the longitudinal axis L, or alternatively a generally rotational displacement around the longitudinal axis L.

This is an important feature of the second embodiment of the pedestal apparatus 10, because any lateral movement (or slop) Z of the shaft portion 30 will result in a corresponding, and typically amplified, lateral displacement of the variable foot arrangement 14. Any such lateral displacement of the shaft portion 30 is undesired as it will compromise the stability of the pedestal apparatus 10 particularly when the pedestal is used on an unlevel or uneven underlying surface.

It is envisaged the relative movement of the shaft portion 30 with respect to the tube portion 28 will extend between a first position, wherein the variable foot arrangement 14 is proximal to the end portion 12.1, and a second position wherein the variable foot arrangement 14 is distal to the end portion 12.1. It should be understood that the variable foot arrangement 14 can be arranged in a respective longitudinally offset position with respect to the fixed foot arrangement 16 for stabilizing the pedestal apparatus 10 on an unlevel or uneven underlying surface.

As seen in FIG. 10, an outward urging means 27 comprising at least one coil spring 32 is arranged to limit axial travel between the shaft portion 30 and the tube portion 28 and allows movement such that the variable foot arrangement 14 can move longitudinally away from, or toward, the fixed foot arrangement 16. The spring 32 may comprise any known springs including compression springs, tension springs and torsion springs. Preferably the spring 32 is joined to the post formation 12 and movably supports the shaft portion 30 in an equilibrium rest position.

In the preferred embodiment the equilibrium rest position is selectively adjustable and is substantially disposed at a point intermediate the first position and the second position. In the exemplary embodiment, the variable foot arrangement 14 can be longitudinally offset from the fixed foot arrangement 16 by between 1 mm to 50 mm and preferably by between 20 mm to 30 mm. An advantage of such a displacement distance is that the spring 32 can be selected to be sufficiently flexible permitting relatively easy movement of the variable foot arrangement 14, but still to provide sufficient rigidity in use once the pedestal arrangement 10 has been substantially stabilized.

In use, the pedestal apparatus 10 according to the second embodiment can be placed upon an uneven or unlevel underlying surface, whereby the variable foot arrangement 14 will initially contact the surface and thereby be moved upwardly away from the equilibrium rest position against the force of the outward urging means 27 until the fixed foot arrangement 16 also comes into contact with the underlying surface. At such position, the pedestal apparatus 10 will be supported and stabilized with all its feet 14.1, 14.2, 16.1, 16.2 being substantially in contact with the underlying surface (not shown).

It is a feature of the second embodiment of the pedestal apparatus 10 that the floating movement of the variable foot arrangement 14 will provide lateral stabilization for the fixed foot arrangement 16. Similarly, the fixed foot arrangement 16 will provide a lateral and longitudinal stabilization for the variable foot arrangement 14.

It should be appreciated that also in the second embodiment of the pedestal apparatus 10 can the variable foot arrangement 14 be moved between the deployed seat formation 20 and the collapsed seat formation 22, as hereinbefore described, by urging the variable foot arrangement 14 away from the end portion 12.1 and suitably rotating the shaft portion 30 about its longitudinal axis L.

Referring now to FIGS. 11 to 16, there is shown a post formation being generally indicated by reference numeral 100, for use with a third embodiment of a pedestal apparatus 10 in accordance with the invention.

The post formation 100 defines an outer tube portion 28 and an inner shaft portion 30 positioned within the tube portion 28. The shaft portion 30 is coaxially aligned within the tube portion 28 and is able to move in a longitudinal direction relative to the tube portion 28 or to rotate around its coaxial axis 102. Although not illustrated, the shaft portion 30 is adapted to support a variable foot arrangement 14, while the tube portion 28 is adapted to support a fixed foot arrangement 16.

Figure 13:
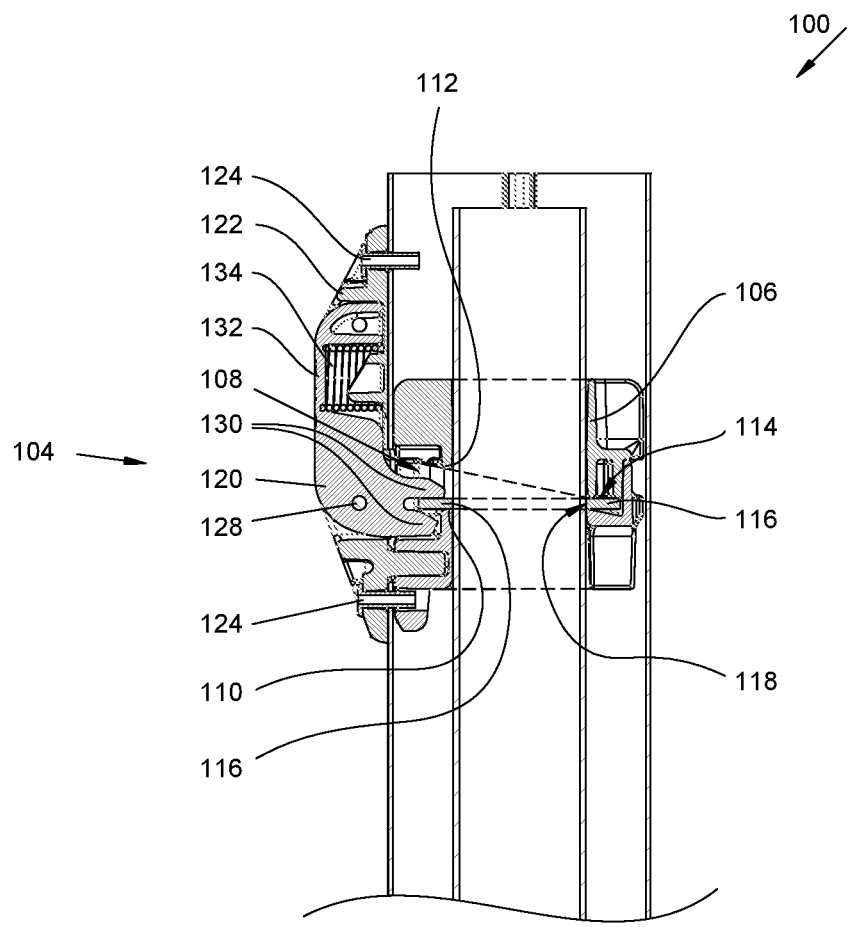
FIG. 13 is an enlarged sectional side view of a part of the post formation seen along arrows XIII-XIII in FIG. 11.

The post formation 100 further includes a locking means 104 that, when in an unlocked condition as shown in FIGS. 11 to 13, permits movement of the shaft portion 30 relative to the tube portion 28 or, when in a locked condition as shown in FIGS. 14 to 16, inhibits movement of the shaft portion 30 relative to the tube portion 28.

The locking means 104 includes a sleeve body 106 located within the tube portion 28 and surrounding the shaft portion 30. The sleeve body 106 defines a substantially triangular shaped cavity 108 (seen in cross-sectional side view) having a base wall 110 and an angled wall 112. The base wall 110 extends substantially perpendicularly to the coaxial axis 102, whereas the angled wall 112 is offset from being perpendicular to the coaxial axis 102. The base wall 110 and the angled wall 112 are arranged to meet at fulcrum 114 that is located to be at least tangential to the shaft portion 30 or preferably offset to the outside of the shaft portion 30. An internal angle between the base wall 110 and the angled wall 112 can be between 5° to 15°, preferably being about 10°.

A substantially flat locking disc 116 is located within the cavity 108. The locking disc 116 is in the form of a washer having an inner edge 118 that surrounds the shaft portion 30. The locking disc 116 has one part of its perimeter located within the fulcrum 114, whereby the locking disc 116 is able to pivot at the fulcrum 114. Accordingly the locking disc 116 is movable between an unlocking condition wherein it abuts against the base wall 110 (see FIG. 13) and a locking condition wherein it abuts against the angled wall 112 (see FIG. 16). In the unlocking condition the inner edge 118 is spaced apart from the shaft portion 30 so that the latter can move freely through or relative to the sleeve body 106. Contrary, in the locking condition at least a part of the inner edge 118 bites into the shaft portion 30 so that the latter is immovably locked to the sleeve body 106.

An actuation member 120 is supported outside the tube portion 28 and is adapted to cause movement of the locking disc 116 between its locking and unlocking conditions. The actuation member 120 includes a support frame 122 fixedly mounted to the tube portion 28 by screws 124. A lever 126 is pivotally mounted to the support frame 122 at pivot 128, with the lever 126 having opposed jaws 130 extending thorough the tube portion 28 into the cavity 108, whereby the locking disc 116 is captured between the jaws 130. A manually operable arm 132 of the lever 126 projects away from the pivot 128, with the arm 132 extending substantially at right angles to the jaws 130. A coil spring 134 is provided between the tube portion 28 and the arm 132 for biasing the arm 132 away from the tube portion 28 (as shown in FIGS. 14 to 16). Accordingly, the lever 126 is biased around pivot 128 so that the jaws 130 hold the locking disc 116 in its locked condition.

In use, when it is desired to adjust position of the shaft portion 30 relative to the tube portion 28, the arm 132 is pressed towards the tube portion 28 to overcome the bias of the spring 134. This causes the lever 126 to rotate around pivot 128, whereby the jaws 130 pivot the locking disc 116 around fulcrum 114 so that it is moved into its unlocked condition, thereby permitting movement of the shaft portion 30. Once the shaft portion 30 is correctly extended/rotated, the arm 132 is released to again cause the locking disc 116 to be biased by spring 134 into its locking condition.

An advantage of having the fulcrum 114 offset to the outer edge of the locking disc 116 is that less force is required to be exerted by the lever 126 to obtain a sufficient biting of the inner edge 118 into the shaft portion 30 to immovably lock the shaft portion 30 relative to the tube portion 28.

Modifications and variations as would be apparent to a skilled addressee are deemed to be within the scope of the present invention.

The invention claimed is:

1. A pedestal apparatus for an article of furniture, the pedestal apparatus comprising:
    an elongate post formation defining a first end and a second end and having a longitudinal axis;
    a fixed foot arrangement being immovably supported by the post formation;
    a variable foot arrangement being movably supported by the post formation, wherein the variable foot arrangement is selectively movable along and around the longitudinal axis for varying a longitudinal and angular proximity between the variable foot arrangement and the fixed foot arrangement; and
    a locking means comprising:
    biasing means adapted to cause the locking means to default to its locked condition such that the fixed foot arrangement and the variable foot arrangement are fixed relative to one another and abut an underlying surface, thereby providing a substantial stabilization of the pedestal apparatus; and
    a single pivotable locking disc surrounding the post formation for said fixing of the foot arrangements relative to one another, wherein the locking disc is gripped and movable by a lever in connection with the biasing means, between an unlocked condition wherein the locking disc is orientated substantially perpendicularly to the longitudinal axis, and a locked condition wherein the locking disc is rotated to be non-perpendicular to the longitudinal axis.

2. A pedestal apparatus as claimed in claim 1, further comprising urging means adapted to restrict the extent of longitudinal movement of the variable foot arrangement relative to the fixed foot arrangement.

3. A pedestal apparatus as claimed in claim 2, in which the urging means is arranged to restrict movement of the variable foot arrangement along the longitudinal axis and to support the variable foot arrangement at an intermediate equilibrium rest position substantially midway of this range.

4. A pedestal apparatus as claimed in claim 3, in which the urging means is a coil spring operatively provided between the post formation and the variable foot arrangement.

5. A pedestal apparatus as claimed in claim 2, in which the urging means is a coil spring operatively provided between the post formation and the variable foot arrangement.

6. A pedestal apparatus as claimed in any one of claim 4, in which the post formation includes a tube portion and a shaft portion, the shaft portion being telescopically supported by the tube portion, and wherein the fixed foot arrangement is provided on the tube portion and the variable foot arrangement is provided on the shaft portion.

7. A pedestal apparatus as claimed in any one of claim 2, in which the post formation includes a tube portion and a shaft portion, the shaft portion being telescopically supported by the tube portion, and wherein the fixed foot arrangement is provided on the tube portion and the variable foot arrangement is provided on the shaft portion.

8. A pedestal apparatus as claimed in any one of claim 3, in which the post formation includes a tube portion and a shaft portion, the shaft portion being telescopically supported by the tube portion, and wherein the fixed foot arrangement is provided on the tube portion and the variable foot arrangement is provided on the shaft portion.

9. A pedestal apparatus as claimed in claim 6, in which the tube portion and the shaft portion have a close tolerance for substantially preventing any transverse movement of the shaft portion off coaxial alignment with the tube portion.

10. A pedestal apparatus as claimed in claim 9, in which the urging means movably supports the shaft portion relative to the tube portion in an equilibrium rest position, in which position the variable foot formation is longitudinally offset from the fixed foot formation.

11. A pedestal apparatus as claimed in claim 6, in which the urging means movably supports the shaft portion relative to the tube portion in an equilibrium rest position, in which position the variable foot formation is longitudinally offset from the fixed foot formation.

12. A pedestal apparatus as claimed in claim 10, in which the variable foot formation is longitudinally offset from the fixed foot formation by between 1 mm to 50 mm.

13. A pedestal apparatus as claimed in claim 12, in which the variable foot formation is longitudinally offset from the fixed foot formation by between 20 mm to 30 mm.

14. A pedestal apparatus as claimed in claim 6, wherein the locking means is arranged to lock the shaft portion relative to the tube portion, thereby to lock the variable foot arrangement at a desired position and angle along the longitudinal axis relative to the post formation.

15. A pedestal apparatus as claimed in claim 1, in which the locking disc is rotated off its perpendicular orientation through between 5° to 15° when in its unlocked condition.

16. A pedestal apparatus as claimed in claim 15, in which the locking disc is rotated off its perpendicular orientation through 10° when in its unlocked condition.

17. A pedestal apparatus as claimed in claim 1, in which the tube portion immovably supports a fulcrum and wherein at least a part of the locking disc is located in the fulcrum.

18. A pedestal apparatus as claimed in claim 17, in which the locking disc is at least partially rotatable around the fulcrum.

19. A pedestal apparatus as claimed in claim 18, wherein the fulcrum and the lever are diametrically opposed to each other on opposite sides of the shaft portion.

\* \* \* \* \*